A. Shellabarger
Walking Corn Planter
Nº 92,889    Patented Jul. 20, 1869.
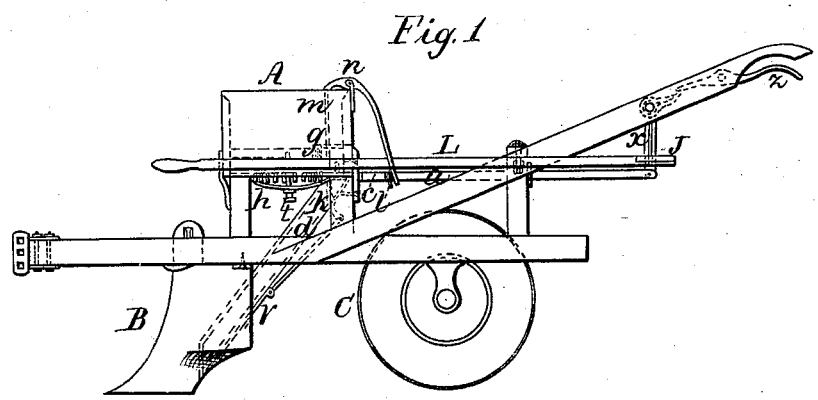
Fig. 1
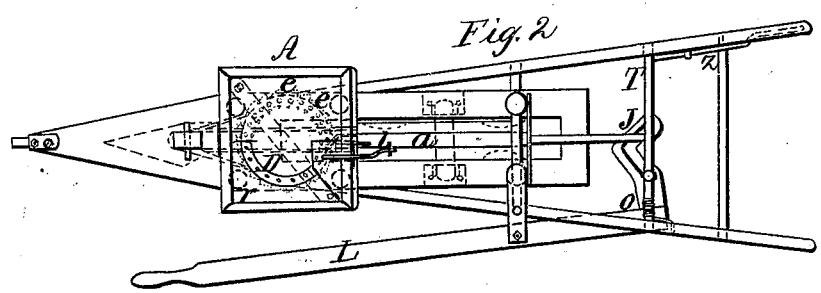
Fig. 2
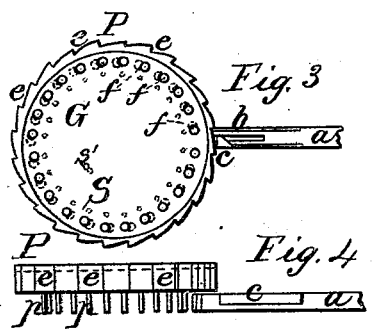
Fig. 3
Fig. 4
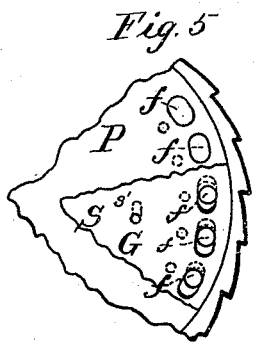
Fig. 5
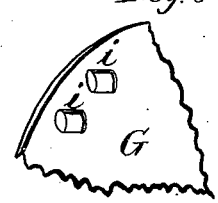
Fig. 6
Witnesses
B. C. Converse
S. Engenperger
Inventor
Amos Shellabarger

United States Patent Office.

AMOS SHELLABARGER, OF MIAMI COUNTY, OHIO.

Letters Patent No. 92,889, dated July 20, 1869.

IMPROVEMENT IN CORN-PLANTERS.

The Schedule referred to in these Letters Patent and making part of the same.

*To all whom it may concern:*

Be it known that I, AMOS SHELLABARGER, of the county of Miami, and State of Ohio, have invented certain new and useful Improvements in Seed-Planters; and I do hereby declare that the following is a clear, full, and exact description thereof, reference being had to the annexed drawings, and to the letters of reference marked thereon, in which similar letters indicate like parts.

The nature of my invention consists in a corn or seed-planter, so constructed as to secure certainty in distance of the seed dropped, and of the quantity or number of grains; also, an even covering or rolling in of the same, and an easy and efficient working of the mechanism for producing these results, the whole of which, in combination, forms a plow and planter for opening the furrow, drilling or dropping of the seed, and covering the same.

Figure 1 is an elevation of my corn or seed-planter.

Figure 2, a plan view of the same.

Figure 3 represents a plan of the dropping-mechanism, showing disks or wheels, P and G, the position of the holes in each, the lips or spacers, and the pins, in dotted lines; also, a section of the lever $a$, and position when thrust forward, in dotted lines.

Figure 4 is an elevation of the same.

Figure 5 is a section of fig. 3, enlarged.

Figure 6 is a section of disk G, showing lips or spacers, $i$ $i$.

In fig. 1, A is the hopper or grain-box, into which the seed to be planted is placed;

B is the plow, for furrowing; and

C, the covering-wheel.

The lever $a$ is bevelled at the front end, and is furnished with two springs, one to operate upon the pins projecting below from the lower wheel or disk P, and the other (which is upon the top of the lever) for operating the latch $k$, which is attached to the valve V in the dropping-tube, this latter acting simply as a releasing-spring when the lever $a$ is drawn back.

The spring extending across the bevelled point of the lever $a$, is marked $b$, and the latch-spring on the top is marked $c$.

The spring $b$ projects beyond the point of the lever $a$, so that in operating the same, the disk P G is moved one space, (the distance between the pins,) and the hole in the upper and lower disks is brought over the grain-pipe, and the seed discharged into the tube $d$, below. It is retained in the grain-tube $d$ until the lever $a$ is thrust forward between the next two pins, when the end of the latch-spring $c$ strikes the latch or lever $k$, pushing it forward, raises the valve V, and the corn or seed dropped in the tube by the preceding action of lever $a$ is discharged into the furrow, and the wheel W following, covers or rolls in the seed.

It will be seen that the grain-wheel G is furnished with projecting lips or spacers, $i$ $i$, reaching down into the slots $ff$ of the pin-wheel P, to lessen or increase the quantity of seed discharged. They are kept in place by a set-screw, S, which passes through the lower disk or wheel P into the upper one, G, a slot, S', being cut in it, to allow the required adjustment.

The lever $a$ is operated by the lever and spring-mechanism upon the handles, consisting of levers X Z and the spiral spring O, lever X being so attached to the handle as to be easily operated by the hand.

The grain-wheel G has only a small number of its slots or cups exposed for the reception of the seed, and in order to insure certainty in the quantity discharged into the tube $d$, a small brush, $g$, is fastened to the inside of the hopper A, in such a manner as to brush back the seed from the discharging-orifice, allowing only a given quantity to reach that point.

The discharge is also rendered more certain by a punch, M, which is operated by the movement of the lever $a$ when it is drawn backward by the action of the spiral spring O, the punch M being connected to the lever N, which has a slot in its lower and outer end, in which the pin $l$, upon the lever $a$, works, (when the lever is drawn backward and forward,) communicating motion to the punch M.

A lever, L, with a cam, J, upon its rear end, is used when the machine is drawn by two horses. This can be worked by a boy sitting upon the front part.

The cam J has a lever, which extends down through its slot from the iron cross-brace T, which is worked by throwing the lever L out and in horizontally, giving motion to the lever $a$ through its connection, X, with the iron cross-brace T, the spring O producing the backward motion, while levers Z and X produce the forward motion, when worked by the hand at Z, or when worked from the lever L.

The pin-wheel P and disk G turn upon the point of set-screw $t$, passing up through the bridge-tree $h$ from below the hopper-box.

The slot D, seen in the hopper-box in fig. 2, shows a few of the cups, which are open for the reception of the seed put into the hopper-box A. Each one, in passing around under the brush $g$, reaches the discharge-pipe with the same quantity of seed precisely.

The distance between the points at which the seed is dropped may be varied, at pleasure, either when the dropping is done, by working lever Z or L, the action of the dropping-apparatus being governed by either lever.

The triangular-shaped spring-piece $c$, as shown in fig. 3, acts as an abutting-piece in thrusting the latch $k$ forward to raise the valve V at the lower and under part of the grain-tube $d$, and also as a releasing-spring when the lever $a$ is drawn back.

A spring-pawl, $r$, fig. 2, falling into notches, $e$ $e$, regulates the stop-motion of pin-wheel P in discharging the grain.

Having thus described my invention,

What I claim as new, and desire to secure by Letters Patent, is—

1. The arrangement of the grain-wheel or disk G, with its projecting lips or spacers *i i*, and pin-wheel P, with set-screw S, for regulating the sizes of discharges holes *f f*, with slot S', for adjusting the same, as shown and described.

2. The lever *a*, with springs *b* and *c*, arranged for operating the rotating wheel or disk P, the valve V, and punch M together, as shown and described.

3. The combination of levers Z X L, cam J, and lever *a*, with springs *b* and *c*, for operating the dropping-mechanism, as shown and described.

4. The arrangement of the punch M, brush *g*, and disks G and P, as shown and described.

Witness my hand to my application for a patent for an improvement in corn or seed-planters.

AMOS SHELLABARGER.

Witnesses:
B. C. CONVERSE,
J. ENGENSPERGER.